O. C. ZERCK.
CALIPERS.
APPLICATION FILED MAR. 20, 1914.
1,170,384.
Patented Feb. 1, 1916.
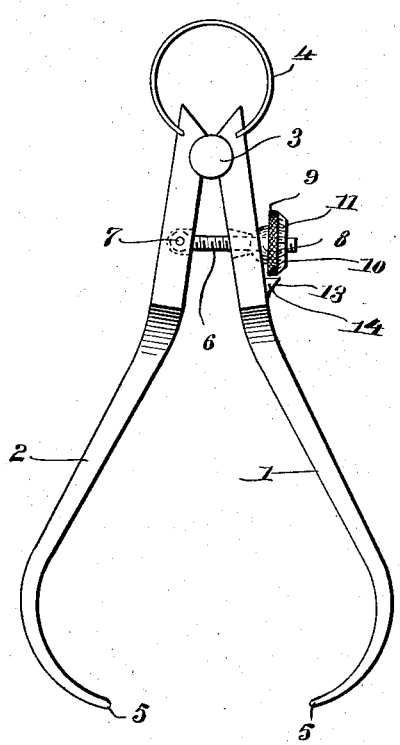
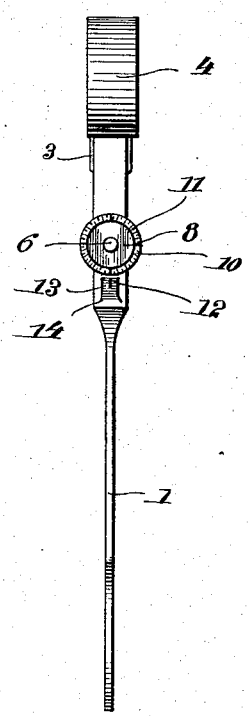
Witnesses
Frederick W. Ely.
Dudley B. Howard
Inventor
O. C. Zerck,
By Victor J. Evans
Attorney

UNITED STATES PATENT OFFICE.

OTTO C. ZERCK, OF LOS ANGELES, CALIFORNIA.

CALIPERS.

1,170,384.  Specification of Letters Patent.  Patented Feb. 1, 1916.

Application filed March 20, 1914. Serial No. 826,068.

*To all whom it may concern:*

Be it known that I, OTTO C. ZERCK, a citizen of the United States, residing at Los Angeles, in the county of Los Angeles and State of California, have invented new and useful Improvements in Calipers, of which the following is a specification.

This invention relates to calipers such as are used by wood-workers and machinists, and in particular to means forming a part of calipers whereby the active extremities of the legs of each pair may be adjusted relatively and set with accuracy, without the necessity of employing a rule or other scale of linear measurement in this operation. It is the usual practice, in the arts referred to above, to employ a scale for use in connection with outside and inside calipers in adjusting the same. Each pair of calipers has a spring which tends normally to spread the legs of the same, and a screw and adjusting nut by which the legs may be drawn toward each other or released as the active extremities thereof are set, with reference to the scale, at a predetermined distance, the scale being held contiguous to these extremities during this operation.

It is therefore the purpose of my invention to provide a pair of calipers having a micrometer adjustment embodied in the construction thereof in order that it will be unnecessary to employ a separate scale or other measuring device, or necessary for the operator to use both hands in setting the calipers.

The invention consists in the features of construction, combination, and arrangement of parts, hereinafter fully described and claimed, reference being had to the accompanying drawings, in which:

Figure 1 is a side elevation of a pair of outside calipers constructed in accordance with the invention; and Fig. 2 is a front elevation of the same.

In the drawing, the numerals 1 and 2 designate the usual pivoted members of a pair of outside calipers, which are pivotally connected at 3 and have a spring 4 also connecting the same and tending normally to spread the active ends 5 thereof. The usual adjusting screw 6 has one end pivotally connected as at 7 with one of the pivoted members and projects through a slot in the other member. Instead of employing the usual thumb nut for this screw, an adjusting nut 8, having a cylindrical, externally knurled inner portion 9 and a frusto-conical outer portion 10, is mounted upon the protruding outer end of the screw. A graduated scale 11 is inscribed in suitable manner upon the outer periphery of the frusto-conical portion 10 of the nut for coöperation with the indicating mark 12 provided upon the tapered outer face 13 of a lug 14 which is formed upon the adjacent pivoted member or leg of the instrument, contiguous to the outer periphery of its cylindrical portion. The lug 14 is constructed equal in length to the cylindrical portion of the adjusting nut, and its inclined face 13 is arranged substantially at the same angle of inclination to the member upon which it is formed as the outer periphery of the frusto-conical nut portion bears to the longitudinal axis thereof, whereby the micrometer scale thus formed may be read readily and with accuracy. The scale is so graduated that the distance between the active extremities 5 may be determined by reading the same.

The adjusting screw is arranged so that it may be operated easily by the thumb and fore-finger of the hand in which the instrument is held, so that the object whose diameter is to be measured may be held in the other hand, or this hand may be used to advantage in some other operation at the same time, which could not be done in using the ordinary type of calipers.

What is claimed is:

A device of the character described, consisting of a pair of caliper arms, a spring connected to the ends thereof, one of said arms being formed with a slot, a threaded bolt projecting through said slot, and being pivotally mounted upon the other arm, an adjusting nut engaging said bolt and bearing against one of said arms, said nut being cylindrical and having a beveled edge, said beveled edge having a series of graduated notches upon the same, and a fixed lug formed on one of said arms and having sides inclined substantially to the same pitch as said beveled edge, said inclined side of said lug having a single notch coöperating with said first named notches.

In testimony whereof I affix my signature in presence of two witnesses.

OTTO C. ZERCK.

Witnesses:
H. E. KNOLES,
L. E. KNOLES.